G. W. BROWN.
Ice-Cream Freezer.
No. 28,449.
Patented May 29, 1860.
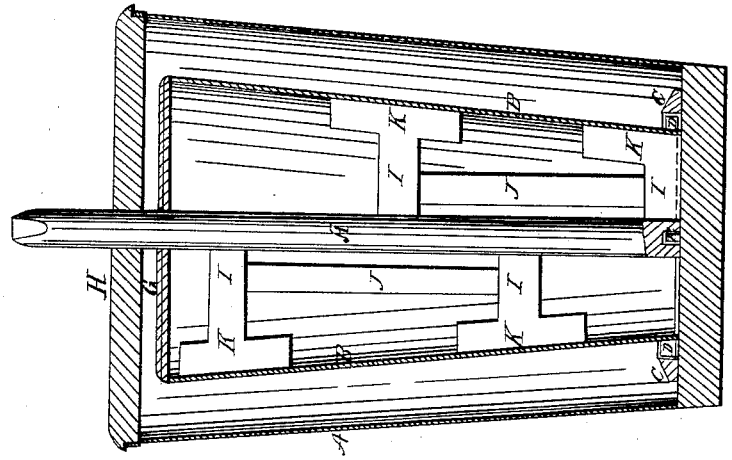
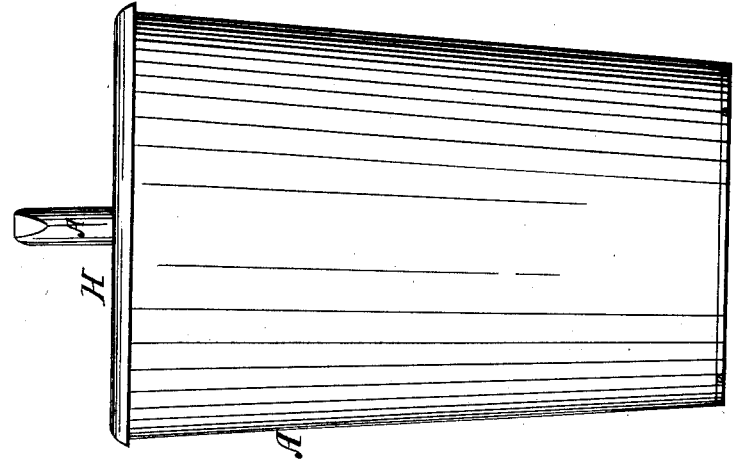
Witnesses:
L. P. Johnson
Charles E. Lewis
Inventor:
George W. Brown
By his Attorney J. Dennis Jr.

UNITED STATES PATENT OFFICE.

GEORGE W. BROWN, OF NEW YORK, N. Y.

ICE-CREAM FREEZER.

Specification of Letters Patent No. 28,449, dated May 29, 1860.

*To all whom it may concern:*

Be it known that I, GEORGE W. BROWN, of the city, county, and State of New York, have invented certain new and useful Improvements in Ice-Cream Freezers; and I do hereby declare that the same is described and represented in the following specifications and drawings.

To enable others skilled in the art to make and use my improvements I will proceed to describe their construction and operation referring to the drawings in which the same letters indicate like parts in each of the figures.

Figure 1, is an elevation of my ice cream freezer. Fig. 2 is a sectional elevation.

The nature of my invention and improvement in freezers for making ice cream consists in a conical can to contain the cream to be frozen, provided with a tapering dasher fitted to the can and arranged to turn freely in it.

In the accompanying drawings A, is the ice tub; B, the cream can, both of which are made conical and smallest at the bottom as shown in Figs. 1, and 2. The bottom of the ice tub has two cleats C, C, on it with scores in them for the lugs D, D, on the cream can B, which lugs fit into scores in the cleats to hold the can and prevent it from turning in the tub A.

There is a pivot E, fastened to the bottom of the cream can on the inside, and a hole made in the lower end of the dasher shaft F, so as to turn freely on the pivot E. This dasher shaft F, extends up through the cover G, of the can and through the cover H, of the tub, and may be provided with a crank to turn it by hand, or with a pulley or gear, to turn it by power of some other kind.

The arms I, I, are firmly fastened in or to the shaft F, and connected by the bars J, J, as shown in the drawing, Fig. 2, and the scrapers K, K, are fastened to and made a part of the arms in the form shown, so as to stir and agitate the cream until the whole mass of cream is frozen.

It will be apparent from the above description and drawing that the arms, bars and scrapers form a tapering dasher, corresponding with the inside of the conical can. I contemplate that the lower end of the tapering dasher will wear away so much faster than the sides that it will keep the sides of the dasher as near the can as may be necessary. But if the bottom should not wear off as contemplated it may be cut off, and a collar may be applied to the shaft above the cover of the ice tub, and a forked lever may be applied to the collar working on a fulcrum fastened to the cover of the tub, so that the operator may raise and lower the dasher with one hand while he turns it with the other.

The advantage of making the can conical and smallest at the bottom is that after the cream is frozen the dasher can be taken out and the can turned over on a dish,—when the can may be raised off of the frozen cream leaving it in a conical pyramid, ready to be served.

I believe I have described and represented my improvements in ice cream freezers, so as to enable any person skilled in the art to make and use them. I will now state what I desire to secure by Letters Patent, to wit:

A conical can in combination with a tapering dasher made to correspond with the can substantially as described for the purposes set forth.

GEORGE W. BROWN.

Witnesses:
JAMES G. COOPER,
J. HOLLENDER.